(12) United States Patent
Dillingham

(10) Patent No.: US 12,461,705 B1
(45) Date of Patent: Nov. 4, 2025

(54) VIDEOCONFERENCING PLATFORM HAVING IMPROVED AUDIO QUALITY

(71) Applicant: Katherine H. Dillingham, New York, NY (US)

(72) Inventor: Katherine H. Dillingham, New York, NY (US)

(73) Assignee: My Blue Skies Music Inc., New York, NY (US)

( * ) Notice: Subject to any disclaimer, the term of this patent is extended or adjusted under 35 U.S.C. 154(b) by 451 days.

(21) Appl. No.: 18/071,172

(22) Filed: Nov. 29, 2022

Related U.S. Application Data

(60) Provisional application No. 63/285,317, filed on Dec. 2, 2021.

(51) Int. Cl.
G06F 3/16 (2006.01)
H04R 3/04 (2006.01)

(52) U.S. Cl.
CPC ............... *G06F 3/165* (2013.01); *H04R 3/04* (2013.01)

(58) Field of Classification Search
CPC ........ G06F 3/165; H04R 3/04; H04R 2420/01
See application file for complete search history.

(56) References Cited

U.S. PATENT DOCUMENTS

| | | | |
|---|---|---|---|
| 7,853,342 B2 | 12/2010 | Redmann | |
| 8,170,191 B2 | 5/2012 | Potekhin et al. | |
| 8,180,063 B2 | 5/2012 | Henderson | |
| 8,270,585 B2 | 9/2012 | Kumar et al. | |
| 8,456,508 B2 | 6/2013 | Jeong et al. | |
| 9,106,790 B2 | 8/2015 | Bicker | |
| 9,172,817 B2 | 10/2015 | Sorensen et al. | |
| 9,269,367 B2 | 2/2016 | Strömmer et al. | |
| 9,325,853 B1 | 4/2016 | Marinov | |
| 10,205,914 B2 | 2/2019 | Bateman et al. | |
| 10,553,239 B2 | 2/2020 | Reynolds | |
| 11,380,345 B2 | 7/2022 | Feng et al. | |
| 11,404,055 B2 | 8/2022 | Ji et al. | |
| 2020/0272713 A1* | 8/2020 | Black | H04L 9/3239 |
| 2020/0396329 A1 | 12/2020 | Liu et al. | |
| 2021/0051405 A1 | 2/2021 | Gwock | |
| 2021/0125622 A1 | 4/2021 | Zhao | |
| 2021/0151065 A1 | 5/2021 | Lindstrom et al. | |
| 2022/0182700 A1* | 6/2022 | Utile | G06Q 10/101 |
| 2022/0377126 A1* | 11/2022 | Marchuk | H04L 67/06 |

* cited by examiner

*Primary Examiner* — Joseph Saunders, Jr.
(74) *Attorney, Agent, or Firm* — NEO IP

(57) ABSTRACT

A server platform receives audiovisual signals from one or more user devices and transmits corresponding audiovisual signals to one or more other user devices, thereby facilitating a web meeting. The platform allows for a selection of audio quality and other audio processing settings, including ambient noise reduction and echo filtering, independent of video quality settings. The platform is able to receive video data from multiple video input sources connected to the same user device, providing the ability to simultaneously show a face of the user and the movements of the hands of a user on a musical instrument. The platform further provides for the creation of NFTs for recordings of musical performances, wherein the NFTs include smart contracts automatically transferring a set percentage of secondary sales of the NFT to the original artist.

19 Claims, 15 Drawing Sheets

FIG. 3

Manage Account

- Account Details
- Audio/Video Settings
- Billing
- Switch to Student
- Delete Account Payment Details   Billing History

Invoice for monthly subscription – Download PDF
Paid $19.99 on December 1, 2021

Invoice for teaching hours – Download PDF
Paid $3.00 on November 28, 2021

Invoice for teaching hours – Download PDF
Paid $9.00 on November 12, 2021

Invoice for teaching hours – Download PDF
Paid $3.00 on November 6, 2021

Invoice for monthly subscription – Download PDF
Paid $7.99 on November 1, 2021

Schedule    Start Lesson    Students

VIDEOCONFERENCING PLATFORM HAVING IMPROVED AUDIO QUALITY

CROSS-REFERENCES TO RELATED APPLICATIONS

The application is related to and claims priority from the following U.S. patent documents: this application claims priority from and the benefit of U.S. Provisional Patent Application No. 63/285,317, filed Dec. 2, 2021, which is incorporated herein by reference in its entirety.

BACKGROUND OF THE INVENTION

1. Field of the Invention

The present invention relates to videoconferencing platforms, and more specifically to improvements to audio quality for videoconferencing platforms.

2. Description of the Prior Art

It is generally known in the prior art to provide online video conferencing platforms, for meetings, lessons, and/or games.

Prior art patent documents include the following:

U.S. Pat. No. 11,380,345 for Real-Time Voice Timbre Style Transform by inventors Feng et al., et al., filed Oct. 15, 2020 and issued Jul. 5, 2022, discloses transforming a voice of a speaker to a reference timbre including converting a first portion of a source signal of the voice of the speaker into a time-frequency domain to obtain a time-frequency signal; obtaining frequency bin means of magnitudes over time of the time-frequency signal; converting the frequency bin magnitude means into a Bark domain to obtain a source frequency response curve (SR), where SR (i) corresponds to magnitude mean of the ith frequency bin; obtaining respective gains of frequency bins of the Bark domain with respect to a reference frequency response curve (Rf); obtaining equalizer parameters using the respective gains of the frequency bins of the Bark domain; and transforming the first portion to the reference timbre using the equalizer parameters.

U.S. Pat. No. 11,404,055 for Simultaneous dereverberation and denoising via low latency deep learning by inventors Ji et al., et al., filed Oct. 16, 2020 and issued Aug. 2, 2022, discloses a method including extracting, from a frame of the audio sample, spectral features indicative of cochlear impulse response of an auditory system; obtaining an estimate of a speech signal in the frame from a neural network that is trained, during a training phase, to accept the spectral features as input and output the estimate of the speech signal, where the estimate of the speech signal includes reverberation and excludes noise present in the frame; mapping the estimate of the speech signal to a frequency domain of the frame using mapping parameters obtained during the training phase to obtain an estimate of a reverberant speech spectrum in the frame; and obtaining, from a time-distributed neural network, a dereverberant frame of the frame, where the estimate of the reverberant speech spectrum in the frame is used as an input to the time-distributed neural network.

US Patent Publication No. 2021/0125622 for Digital Voice Packet Loss Concealment Using Deep Learning by inventor Zhao, filed Oct. 29, 2019 and published Apr. 29, 2021, discloses a method for recovering a current frame of an audio stream including detecting that a current packet is lost, the current packet including an audio signal; splitting one or more frames into respective high-band signals and respective low-band signals, the one or more frames precede the current frame in the audio stream; inferring a current low-band signal of the current frame using, as inputs to a machine-learning model, the respective low-band signals; combining the inferred current low-band signal with the respective high-band signals to obtain the current frame; and adding the current frame to a playout buffer.

US Patent Publication No. 2021/0151065 for Adaptive Energy Limiting for Transient Noise Suppression by inventors Lindstrom et al., filed Dec. 3, 2019 and published May 20, 2021, discloses adaptive energy limiting for transient noise suppression. In some aspects, an adaptive energy limiter sets a limiter ceiling for an audio signal to full scale and receives a portion of the audio signal. For the portion of the audio signal, the adaptive energy limiter determines a maximum amplitude and evaluates the portion with a neural network to provide a voice likelihood estimate. Based on the maximum amplitude and the voice likelihood estimate, the adaptive energy limiter determines that the portion of the audio signal includes noise. In response to determining that the portion of the audio signal includes noise, the adaptive energy limiter decreases the limiter ceiling and provides the limiter ceiling to a limiter module effective to limit an amount of energy of the audio signal. This may be effective to prevent audio signals from carrying full energy transient noise into conference audio.

U.S. Pat. No. 8,456,508 for Audio processing in a multi-participant conference by inventors Jeong, et al., filed Nov. 29, 2010 and issued Jun. 4, 2013, discloses an architecture for establishing multi-participant audio conferences over a computer network. This architecture has a central distributor that receives audio signals from one or more participants. The central distributor mixes the received signals and transmits them back to participants. In some embodiments, the central distributor eliminates echo by removing each participant's audio signal from the mixed signal that the central distributor sends to the particular participant.

US Patent Publication No. 2020/0396329 for Acoustic echo cancellation based sub band domain active speaker detection for audio and video conferencing applications by inventors Liu, et al., filed Aug. 26, 2020 and published Dec. 17, 2020, discloses systems, methods, and devices for detecting an active speaker in a two-way conference. Real time audio in one or more sub band domains are analyzed according to an echo cancellor model. Based on the analyzed real time audio, one or more audio metrics are determined from output from an acoustic echo cancellation linear filter. The one or more audio metrics are weighted based on a priority, and a speaker status is determined based on the weighted one or more audio metrics being analyzed according to an active speaker detection model. For an active speaker status, one or more residual echo or noise is removed from the real time audio based on the one or more audio metrics.

U.S. Pat. No. 8,170,191 for Method and system for handling audio signals of conference by inventors Potekhin, et al., filed Aug. 2, 2004 and issued May 1, 2012, discloses a new system and method particularly useful in handling the audio of a "large" conference. The system and method initially defines certain conferees as panel members, which can provide audio to and receive audio from the conference, and audience members, which only passively receive audio from the conference. In one aspect, an audience member can request to participate in the conference. By making an appropriate request, the audience member can, if system resources are adequate, participate fully as a panel member and may supply audio to the conference for at least some portion of time. Alternatively, the audience member can supply information other than audio data to the conference, such as voting data or other data allowing the audience member to participate in the conference as more than a merely passive listening participant.

U.S. Pat. No. 9,269,367 for Processing audio signals during a communication event by inventors Strommer, et al., filed Aug. 18, 2011 and issued Feb. 23, 2016, discloses a method of processing audio signals during a communication session between a user device and a remote node, including receiving a plurality of audio signals at audio input means at the user device including at least one primary audio signal and unwanted signals and receiving direction of arrival information of the audio signals at a noise suppression means. Known direction of arrival information representative of at least some of said unwanted signals is provided to the noise suppression means and the audio signals are processed at the noise suppression means to treat as noise, portions of the signal identified as unwanted dependent on a comparison between the direction of arrival information of the audio signals and the known direction of arrival information.

US Patent Publication No. 2021/0051405 for Method and apparatus for controlling audio using asymmetric channel of audio conference by inventor Gwock, filed Aug. 13, 2020 and published Feb. 18, 2021, discloses methods and systems for controlling audio using an asymmetric channel of an audio conference. An audio control method may include establishing, by a processor included in a computer apparatus, a bi-directional media session having an asymmetric channel structure between a first participant among a plurality of participants participating in an audio conference and a mixer, receiving, by the processor, first audio data from the first participant through a media session of a first channel structure in the bi-directional media session, mixing, by the processor, second audio data of at least two participants excluding the first participant from among the plurality of participants, using a multichannel, and transferring, by the processor, the mixed audio data of the at least two participants mixed using the multichannel to the first participant through a media session of a second channel structure in the bi-directional media session.

U.S. Pat. No. 10,553,239 for Systems and methods for improving audio conferencing services by inventor Reynolds, filed Nov. 30, 2016 and issued Feb. 4, 2020, discloses systems and methods for improving audio conferencing services. One aspect relates to processing audio content of a conference. A first audio signal is received from a first conference participant, and a start and an end of a first utterance by the first conference participant are detected from the first audio signal. A second audio signal is received from a second conference participant, and a start and an end of a second utterance by the second conference participant is detected from the second audio signal. The second conference participant is provided with at least a portion of the first utterance, wherein at least one of start time, start point, and duration is determined based at least in part on the start, end, or both, of the second utterance.

U.S. Pat. No. 8,270,585 for System and method for an endpoint participating in and managing multipoint audio conferencing in a packet network by inventors Kumar, et al., filed Nov. 4, 2003 and issued Sep. 18, 2012, discloses a system and method for implementing a multipoint control unit in an endpoint that is participating in and managing a multipoint audio conference in a packet network. The multipoint control unit establishes audio communications between a plurality of endpoints of the packet network, mixes audio communications from the plurality of endpoints, and provides echo cancellation for the endpoint that is managing the multipoint audio conference.

U.S. Pat. No. 9,172,817 for Communication system by inventors Sorensen, et al., filed Dec. 23, 2011 and issued Oct. 27, 2015, discloses an echo component of a first signal received at an audio input device being removed. A second signal is output from an audio output device. The echo component in the first signal is the result of the second signal traversing an echo path. The characteristics of the first and second signals are compared, and if the first signal only comprises the echo, an estimate of the echo path is determined by comparing the first and second signals. The echo path estimate is applied to the first signal to determine an equalized first signal, which is compared with the second signal to determine an estimate of the echo component. The echo component from the first signal is removed in dependence on the estimate of the echo component.

U.S. Pat. No. 10,205,914 for Wireless video camera and connection methods including multiple video or audio streams by inventors Bateman, et al., filed Oct. 31, 2017 and issued Feb. 12, 2019, discloses systems and methods for streaming video and/or audio from wireless cameras. Methods may include, at a network camera, receiving an instruction to begin video capture from a first network node, including information identifying a second network node. A first video stream may be sent from the network camera to the first network node, and a second video stream may be simultaneously sent to the second network node. The first and second video streams may be based on common video capture data, and may be sent at different bitrates, different resolutions, different frame-rates, and/or different formats. A parameter of the second video stream may be adjusted in response to performance data received from the second network node or another network node.

U.S. Pat. No. 9,106,790 for VOIP music conferencing system by inventor Bicker, filed Jul. 31, 2013 and issued Aug. 11, 2015, discloses a method including sending a first message to a conference bridge from a first device. The first message includes an audio signal, a video signal, a musical instrument digital interface signal, or combinations thereof. The conference bridge establishes a voice over internet protocol call between the first device, a second device, and a mix controller external to the conference bridge. The method includes receiving a second message from the conference bridge at the first device. The second message comprises a mixed audio signal produced by the conference bridge from the first message and a third message received by the conference bridge from the second device. The mix controller sets a mixing level for each audio signal used to produce the mixed audio signal. The method also includes processing the second message via the first device to generate an output.

U.S. Pat. No. 9,325,853 for Equalization of silence audio levels in packet media conferencing systems by inventor Marinov, filed Sep. 24, 2015 and issued Apr. 26, 2016, discloses a method for equalizing silence levels includes receiving, at a selective forwarding unit (SFU), media protocol packets corresponding to an audio stream, wherein each particular media protocol packet comprises a packet header comprising an audio level value identifying an audio level of an audio sample that is carried in that particular media protocol packet. The method further includes equalizing, by the SFU, a silence level of the audio stream by determining a minimum audio level of the audio stream over a time period using the audio level from each of a subset of the media protocol packets corresponding to the time period, setting the silence level for the audio stream to the minimum audio level by updating a stored silence level value in digital memory, performing, by the SFU, an action using the silence level and using packets communicated from the SFU toward client devices.

U.S. Pat. No. 7,853,342 for Method and apparatus for remote real time collaborative acoustic performance and recording thereof by inventor Redmann, filed Oct. 11, 2006 and issued Dec. 14, 2010, discloses a method and apparatus to permit real time, distributed acoustic performance by multiple musicians at remote locations. The latency of the communication channel is reflected in the audio monitor used by the performer. This allows a natural accommodation to be made by the musician. Simultaneous remote acoustic performances are played together at each location, though not necessarily simultaneously at all locations. This allows locations having low latency connections to retain some of their advantage. The amount of induced latency can be overridden by each musician. The method preferably employs a CODEC able to aesthetically synthesize packets missing from the audio stream in real time.

U.S. Pat. No. 8,180,063 for Audio signal processing system for live music performance by inventor Henderson, filed Mar. 26, 2008 and issued May 15, 2012, discloses a method for generating and/or performing music in real time including receiving one or more audio signals, receiving one or more virtual instrument trigger signals, and selecting one or more plug-ins and/or one or more virtual instruments. A processing scheme is selected from a set of operations. The received audio signals and instrument trigger signals are processed in real time as a function of the selected plug-ins, virtual instruments and processing scheme, and outputted in real time as music signals. The set of operations from which the processing scheme can be selected includes: (1) manipulating the received audio signals as a function of the selected sound effects plug-ins to produce manipulated audio signals, and/or (2) generating virtual instrument sound signals as a function of the received trigger signals and the selected virtual instruments, and/or (3) manipulating the virtual instrument sound signals as a function of the selected sound effect plug-ins to produce manipulated virtual instrument signals, and/or (4) combining the received audio signals and/or the manipulated audio signals and/or the virtual instrument sound signals and/or the manipulated virtual instrument signals to produce combined signals, and/or (5) manipulating any or all of the combined signals to produce manipulated combined signals, and/or (6) repeating operations (4) and/or (5) with any or all of the combined signals and/or with any or all of the manipulated combined signals to produce iteratively processed signals.

SUMMARY OF THE INVENTION

The present invention relates to videoconferencing platforms, and more specifically to improvements to audio quality for videoconferencing platforms.

It is an object of this invention to offer a videoconferencing platform with improved audio quality to allow for improved online music lessons, concerts, and other events where audio quality is paramount.

In one embodiment, the present invention is directed to a system for live audio streaming, including a server platform, including a processor and a memory, and a database configured for network communication with a plurality of user devices, wherein the server platform is configured to facilitate audio and/or video calls between two or more of the plurality of user devices, wherein the server platform receives a recording request to record at least one of the audio and/or video calls, and stores a recording of the at least one of the audio and/or video calls in the database, and wherein the server platform is operable to capture, record, and playback portions of an audio waveform of the audio and/or video calls having frequencies greater than approximately 12 kHz.

In another embodiment, the present invention is directed to a system for live audio streaming, including a server platform, including a processor and a memory, and a database configured for network communication with a plurality of user devices, wherein the server platform generates a plurality of user profiles, wherein the server platform receives a request from a first user profile to generate a dummy account, wherein the dummy account corresponds to at least one individual that does not currently have a corresponding user profile and wherein the dummy account is added to a list of contacts for the first user profile, wherein the server platform receives a request from the first user profile to associate the dummy account with an actual user profile, and wherein the server platform automatically replaces each instance of the dummy account with the actual user profile, wherein the server platform is store one or more audio and/or video recordings in the database, wherein the server platform receives a token creation request to generate at least one non-fungible token (NFT) corresponding to at least one recording, wherein the server platform automatically generates the at least one NFT on a distributed ledger in response to the token creation request, wherein the at least one NFT includes an embedded smart contract, a link to the at least one recording, and a designation of at least one artist financial account, and wherein upon secondary sale of the at least one NFT, the embedded smart contract executes, causing a set percentage of a purchase amount for the at least one NFT to be automatically transferred to the at least one artist financial account.

In yet another embodiment, the present invention is directed to a method for live audio streaming, including providing a server platform, including a processor and a memory, and a database configured for network communication with a plurality of user devices, the server platform is configured facilitating audio and/or video calls between two or more of the plurality of user devices, the server platform receiving a recording request to record at least one of the audio and/or video calls, and storing a recording of the at least one of the audio and/or video calls in the database, the server platform receiving a token creation request to generate at least one non-fungible token (NFT) corresponding to the recording, the server platform automatically generating the at least one NFT on a distributed ledger in response to the token creation request, wherein the at least one NFT includes an embedded smart contract, a link to the recording, and a designation of at least one artist financial account, and upon secondary sale of the at least one NFT, the embedded smart contract executing, causing a set percentage of a purchase amount for the at least one NFT to be automatically transferred to the at least one artist financial account.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 3 illustrates an account detail GUI for a user profile according to one embodiment of the present invention.

FIG. 5 illustrates a billing GUI according to one embodiment of the present invention.

FIG. 7 illustrates an event creation GUI according to one embodiment of the present invention.

DETAILED DESCRIPTION

Figure 1A:
FIG. 1A illustrates a web meeting graphical user interface (GUI) according to one embodiment of the present invention.

The present invention is generally directed to videoconferencing platforms, and more specifically to platforms for high resolution, real-time videoconferencing.

In one embodiment, the present invention is directed to a system for live audio streaming, including a server platform, including a processor and a memory, and a database configured for network communication with a plurality of user devices, wherein the server platform is configured to facilitate audio and/or video calls between two or more of the plurality of user devices, wherein the server platform receives a recording request to record at least one of the audio and/or video calls, and stores a recording of the at least one of the audio and/or video calls in the database, and wherein the server platform is operable to capture, record, and playback portions of an audio waveform of the audio and/or video calls having frequencies greater than approximately 12 kHz.

In another embodiment, the present invention is directed to a system for live audio streaming, including a server platform, including a processor and a memory, and a database configured for network communication with a plurality of user devices, wherein the server platform generates a plurality of user profiles, wherein the server platform receives a request from a first user profile to generate a dummy account, wherein the dummy account corresponds to at least one individual that does not currently have a corresponding user profile and wherein the dummy account is added to a list of contacts for the first user profile, wherein the server platform receives a request from the first user profile to associate the dummy account with an actual user profile, and wherein the server platform automatically replaces each instance of the dummy account with the actual user profile, wherein the server platform is store one or more audio and/or video recordings in the database, wherein the server platform receives a token creation request to generate at least one non-fungible token (NFT) corresponding to at least one recording, wherein the server platform automatically generates the at least one NFT on a distributed ledger in response to the token creation request, wherein the at least one NFT includes an embedded smart contract, a link to the at least one recording, and a designation of at least one artist financial account, and wherein upon secondary sale of the at least one NFT, the embedded smart contract executes, causing a set percentage of a purchase amount for the at least one NFT to be automatically transferred to the at least one artist financial account.

In yet another embodiment, the present invention is directed to a method for live audio streaming, including providing a server platform, including a processor and a memory, and a database configured for network communication with a plurality of user devices, the server platform is configured facilitating audio and/or video calls between two or more of the plurality of user devices, the server platform receiving a recording request to record at least one of the audio and/or video calls, and storing a recording of the at least one of the audio and/or video calls in the database, the server platform receiving a token creation request to generate at least one non-fungible token (NFT) corresponding to the recording, the server platform automatically generating the at least one NFT on a distributed ledger in response to the token creation request, wherein the at least one NFT includes an embedded smart contract, a link to the recording, and a designation of at least one artist financial account, and upon secondary sale of the at least one NFT, the embedded smart contract executing, causing a set percentage of a purchase amount for the at least one NFT to be automatically transferred to the at least one artist financial account.

None of the prior art discloses a videoconferencing platform specifically tailored toward music lessons, concerts, and other purposes demanding high audio quality. Furthermore, none of the prior art discloses a videoconferencing platform including at least three cameras, wherein one of the cameras dynamically adjusts to provide a close-up view of an instrument being played for instructional purposes.

As a result of the COVID-19 pandemic, many music lessons and concerts have been moved online to videoconferencing services such as ZOOM or SKYPE. Even as the pandemic subsides, online meetings and lessons continue to be popular. However, applications such as ZOOM or SKYPE are intended to provide general videoconferencing services, without a focus on music or other applications where sound quality is most critical. As such, existing general videoconferencing platforms lack detailed audio quality settings that allow users to optimize audio experience. Additionally, even in a high quality audio mode, ZOOM video calls tend to automatically filter frequencies above approximately 12 kHz, which reduces audio quality as it captures a lower percentage of the audio waveform, and which is especially relevant when playing music. In addition to lag and other audio issues, existing general purpose videoconferencing applications do not provide integrated music notation systems, sheet music following systems, lesson management services, or any adaptive camera movements to maintain a focus on an instructor or student's hands playing the music.

Existing videoconferencing applications only allow for a single video input from each user device. Therefore, with existing programs, instructors and students are either forced to focus their cameras on their faces or on their instruments. If the camera is focused on the face, then instructors are unable to see exactly what the student is doing and vice versa. However, if the camera is focused on the instruments, then instructors are less able to discern how well their students are understanding their lessons and adjust based on facial expressions, impeding communications. Additionally, even if the camera is set up to track a user's instrument, the camera will often lose its focus on the user's instrument when the player moves or shifts, decreasing the effectiveness of the lesson. Thus, there is a need for a videoconferencing application with integrated lesson management features and adaptive camera features for focusing on an instrument during play.

The platform facilitates video and/or audio meetings between multiple participants. The platform includes at least one server, including a memory and a processor, and at least one database. In one embodiment, the video and/or audio meetings are conducted via an Internet Protocol (IP)-based wireless local area network (e.g., WI-FI). In another embodiment, the video and/or audio meetings are able to be conducted over a cellular network.

In one embodiment, the video and/or audio meetings are able to support at least 15 participants simultaneously. In one embodiment, the video and/or audio meetings are able to support at least 16 participants simultaneously. In another embodiment, the video and/or audio meetings are able to support at least 30 participants simultaneously. In yet another embodiment, the video and/or audio meetings are able to support at least 50 participants simultaneously. In still another embodiment, the video and/or audio meetings are able to support at least 100 participants simultaneously. One of ordinary skill in the art will understand that alternate numbers of participants are also compatible with the present invention. A participant is defined as a user from which the platform receives audio and/or video data from during the course of the video and/or audio meetings. Participants are also able to receive audio and/or video data from the platform corresponding to data transmitted by other participants. By contrast, a viewer and/or a listener is defined as a user from which the platform does not receive audio and/or video data. However, viewers and/or listeners are able to receive audio and/or video data from the platform corresponding to data transmitted by participants in the video and/or audio meetings. In a preferred embodiment, the video and/or audio meetings are operable to support at least 1 million. In one embodiment, the platform is operable to receive text messages from participants, viewers, and/or listeners. The platform is preferably operable to display any text messages publicly to all participants, viewers, and/or listeners for a particular meeting. Additionally or alternatively, the platform is operable to receive private messages from participants, viewers, and/or listeners, and transmit the private messages to one or more designated recipients.

In one embodiment, participants, viewers, and/or listeners in an audio and/or video meeting are able to record all of the meeting or a section of the meeting, with the recording stored in a database of the platform. Recording meetings allows participants to return to sections of the meeting later for improved learning. In one embodiment, the platform is operable to receive a selection to record in standard definition (SD) or high definition (HD). In one embodiment, the platform is operable to automatically generate a non-fungible token (NFT) corresponding to a recording or a section of a recording. The platform enables NFTs generated through the platform to be automatically transferred to at least one digital wallet associated with the user profile. Providing the ability to generate NFTs provides artists and musicians with a means by which to monetize their performances and encourages creators to continue creating.

In one embodiment, the text messages are stored in a database. In one embodiment, the text messages are operable to be displayed during a playback of the meeting. For example, text messages are synced to the playback such that a text message occurring 10 minutes into the meeting is displayed at 10 minutes when viewing the playback.

Referring now to the drawings in general, the illustrations are for the purpose of describing one or more preferred embodiments of the invention and are not intended to limit the invention thereto.

Figure 1B:
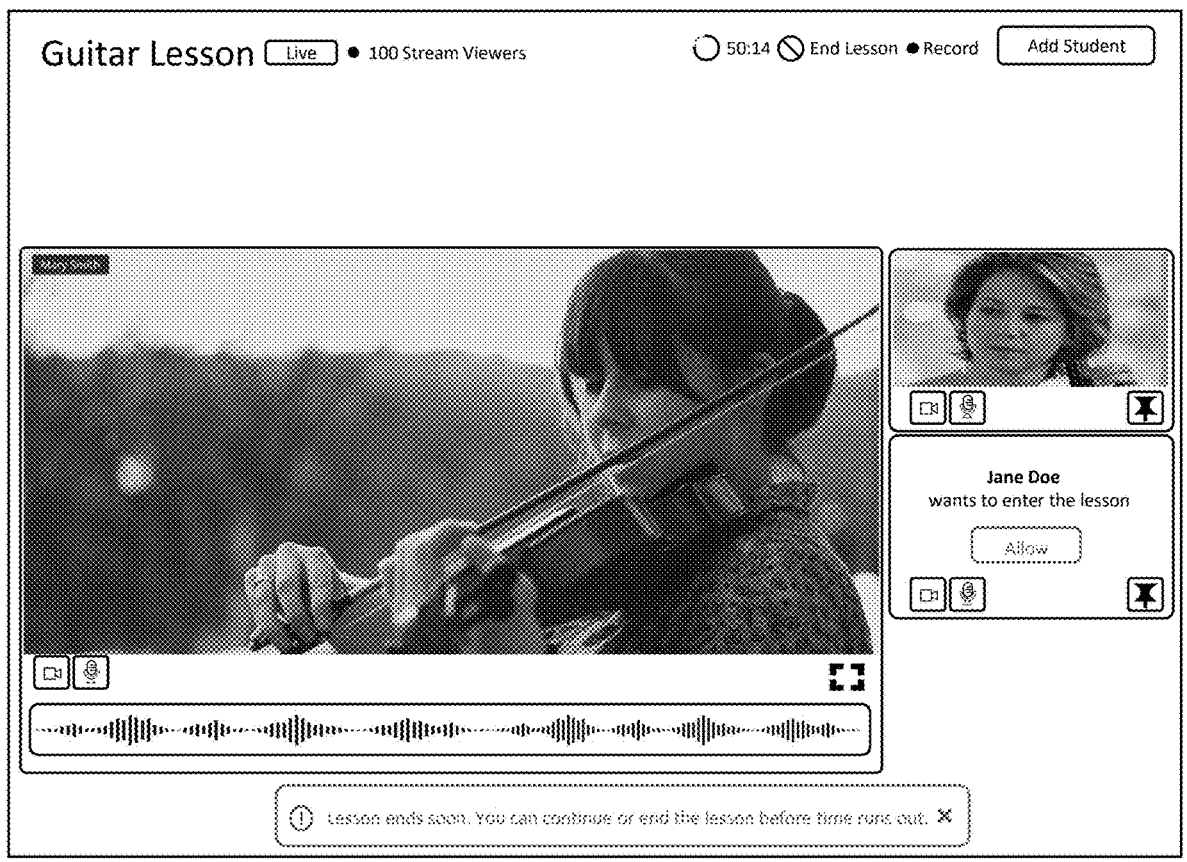
FIG. 1B illustrates a web meeting GUI according to one embodiment of the present invention.

FIGS. 1A and 1B illustrate web meeting graphical user interfaces (GUIs) according to one embodiment of the present invention. The platform generates a web meeting GUI to facilitate an online video meeting between two or more participants. The web meeting GUI preferably includes at least one display window. In one embodiment, the web meeting GUI includes a large primary display window and one or more smaller secondary display windows. In one embodiment, the platform automatically selects the primary display window as whomever is determined to be speaking loudest and/or speaking most consistently over a period of time. Alternatively, the platform is operable to designate the primary display window (e.g., a conductor, a soloist, a singer, etc.). In another embodiment, the platform defaults to showing a user's own video feed as the primary display window. In yet another embodiment, the platform is operable to receive a selection of a video feed to "pin" (e.g., via user input) and the platform automatically provides the pinned video feed as the primary display window. In one embodiment, pinning a video feed is performed by a clicking on the video feed. In one embodiment, the web meeting GUI includes click-selectable options to activate or deactivate a video input feed and/or an audio input feed for the user. In one embodiment, the web meeting GUI includes click-selectable options to active or deactivate a video feed and/or an audio feed for one or more users. In one embodiment, an acoustic waveform visualization for the audio feed corresponding with the video feed shown on the primary display window is overlaid on the primary display window. In one embodiment, the primary display window includes a name and/or a username of the user in the primary display window. The primary display window is also operable to include additional details regarding the user (e.g., instrument, history, educational background, chair, etc.). In one embodiment, the platform is operable to show the primary display window in full screen based on user input. In another embodiment, the platform receives a selection to show the primary display window in widescreen mode based on user input. In one embodiment, the platform receives a selection to share the screen (or a portion of the screen) of a user device connected to the online video meeting.

In one embodiment, the platform generates a timer including the amount of time remaining in a web meeting. In one embodiment, the platform automatically transmits an alert notification to one or more participants in the web meeting when a preset amount of time is remaining in the web meeting (e.g., 1 minute, 5 minutes, 10 minutes, etc.). In one embodiment, the platform receives a setting to automatically allow, automatically block, or allow with permission participants into the web meeting who arrive after the web meeting has begun. If the platform receives a setting to allow with permission, then the platform is operable to receive a selection from a designated meeting coordinator and/or one or more other participants to allow or prohibit the participant from joining the web meeting.

Figure 2:
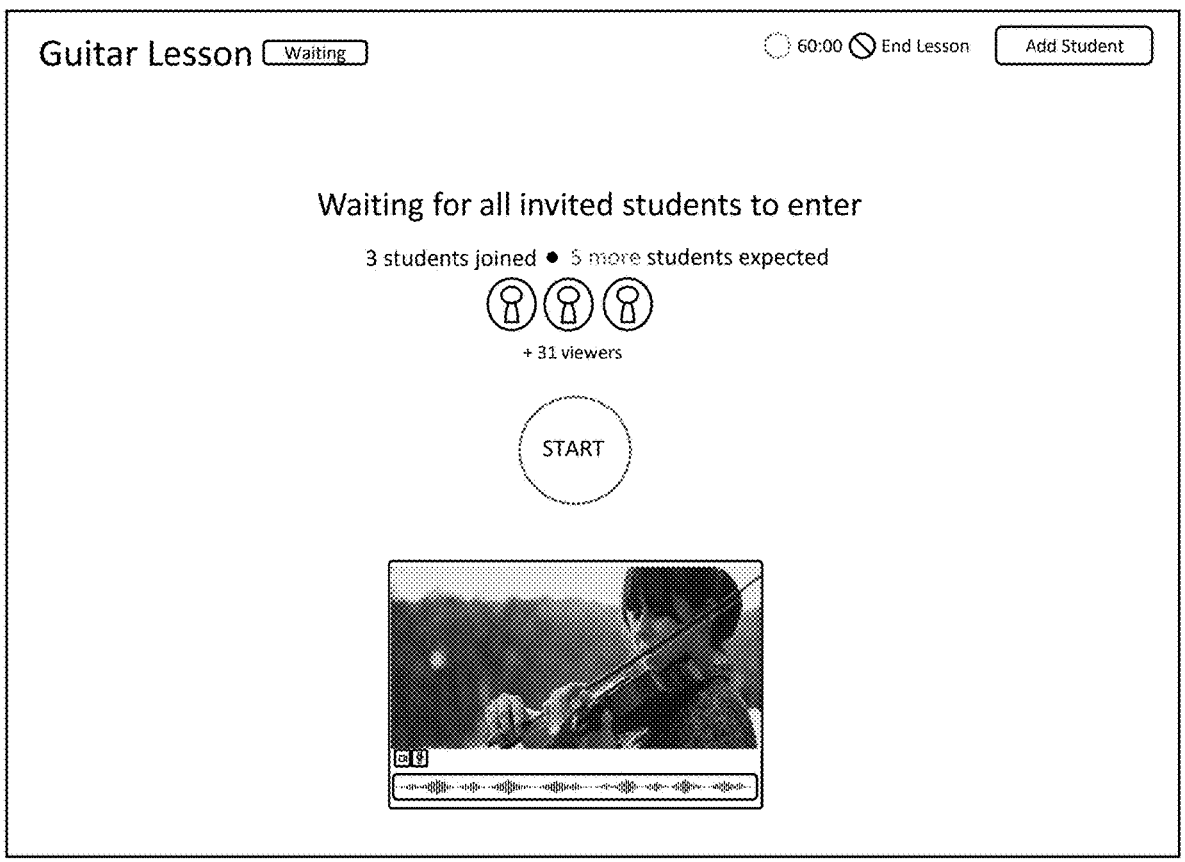
FIG. 2 illustrates a web meeting waiting room GUI according to one embodiment of the present invention.

FIG. 2 illustrates a web meeting waiting room GUI according to one embodiment of the present invention. The waiting room GUI enables a meeting coordinator to view when one or more participants are ready to join the web meeting. In one embodiment, the platform automatically displays a number of participants still expected to join the web meeting who have not yet arrived. In one embodiment, the platform automatically displays a number of non-participating viewers of the web meeting. In one embodiment, the waiting room includes a single camera display window showing only a user's own audio and visual inputs. This allows participants to finesse audio and video settings before the video begins. Advantageously, the web meeting waiting room GUI includes a single large click-selectable button to start a web meeting (whether or not the expected number of participants have joined). Providing a single click-selectable button provides greater ease in using the system, without the complicated, and often confusing, GUI providing by other existing systems. In one embodiment, the platform is only operable to receive a command to start the web meeting from a designated web meeting coordinator.

Figure 3:
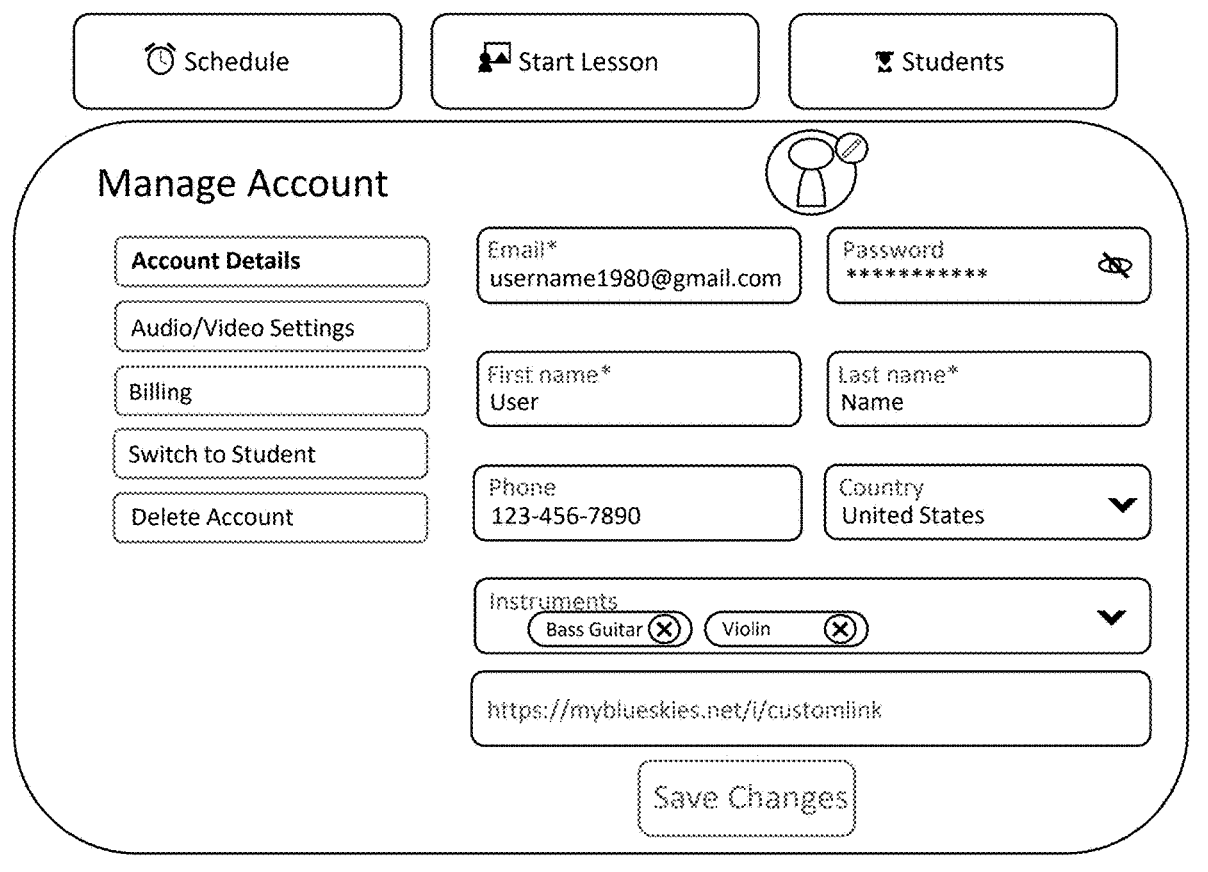

FIG. 3 illustrates an account detail GUI for a user profile according to one embodiment of the present invention. In one embodiment, the platform is operable to generate a user profile for each participant and/or viewer on the video and/or audio meetings. In one embodiment, the platform receives information from a user device including, by way of example and not of limitation, a username, a first name, a last name, at least one picture, an email address, a country of residency, a time zone, a phone number, an alternative means of communication, a password, a birthday, answers to challenge questions, at least one payment method, information from an associated social media account, a preferred musical genre, and/or language proficiency information. In one embodiment, the platform is operable to associate one or more instruments and/or one or more families of instruments with the user profile, including, but not limited to, accordion, acoustic guitar, bandoneon, banjo, bass guitar, bassoon, brass instruments, cello, clarinet, classical guitar, clavichord, double bass, electric guitar, English horn (cor anglais), euphonium, fiddle, flugelhorn, flute, French horn, harmonica, harp, harpsichord, horn, lute, mandolin, oboe, organ, percussion instruments, piano, keyboard, recorder, saxophone, sousaphone, tenor horn, timpani, kettle drum, trombone, trumpet, tuba, ukulele, viola, viola da gamba, viola d'amore, violin, voice, xylophone, and/or other instruments. In one embodiment, the user profile includes a skill level for at least one selected instrument in the user profile (e.g., novice, beginner, intermediate, advanced, expert, master, etc.). In one embodiment, the platform is operable to receive a textual description (or a bio) for each user profile, describing the background, experience, and/or aspirations of each user. In one embodiment, the information received from the user device is used to generate the user profile. In one embodiment, the platform is operable to connect the user profile to at least one other user profile as friends via user input (e.g., from a user device). In one embodiment, the platform automatically generates a custom link for each user profile. The custom link is able to be transmitted to other individuals in order to share one's profile.

Figure 4:
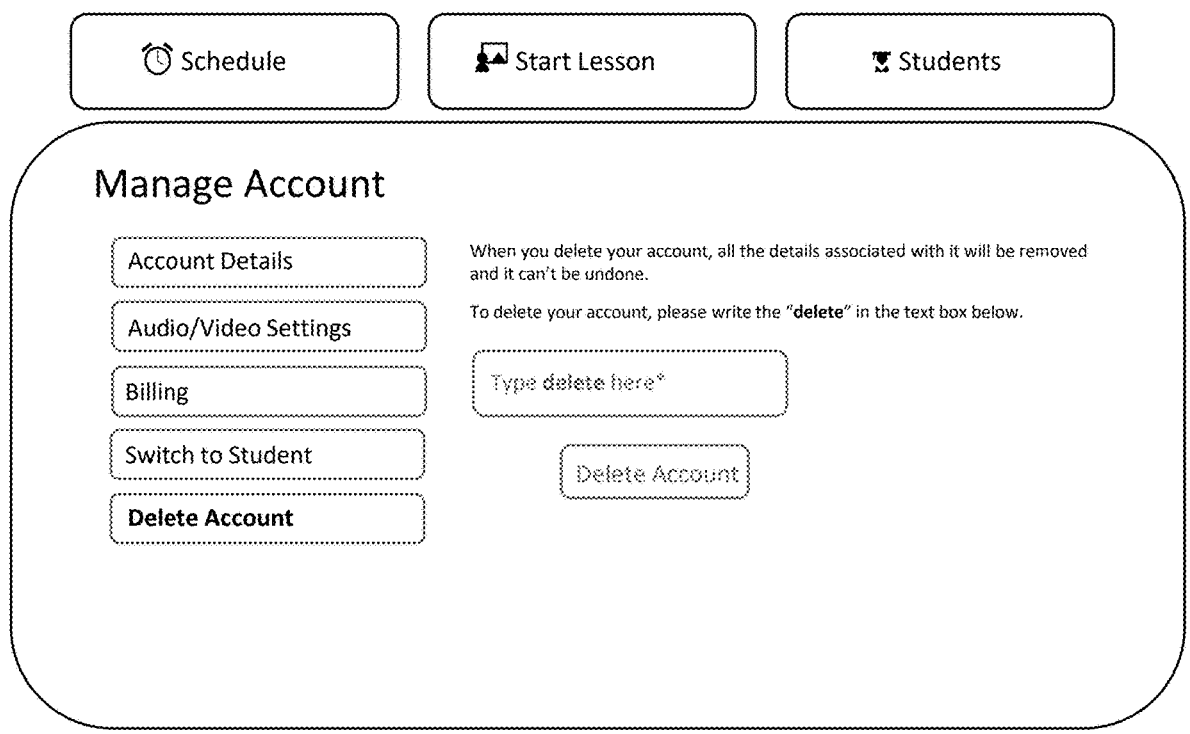
FIG. 4 illustrates an account deletion GUI according to one embodiment of the present invention.

FIG. 4 illustrates an account deletion GUI according to one embodiment of the present invention. In one embodiment, the platform is operable to receive a selection to delete a user profile. In one embodiment, deleting a user profile requires a text box input (e.g., typing delete) and/or a pressing a button. Requiring a text box input decreases the likelihood that a user accidentally deletes the user profile.

FIG. 5 illustrates a billing GUI according to one embodiment of the present invention. In one embodiment, the platform automatically generates a list of transactions made to or by a user profile. In one embodiment, the platform automatically generates an invoice for each transaction. In one embodiment, the invoice is generated as a Portable Document Format (PDF) document. In another embodiment, the platform automatically generates a spreadsheet of transactions over a predetermined time period. In one embodiment, the platform is operable to receive an input from a user profile regarding transactions that are made off the platform. By allowing off-platform transactions to be added to the billing history, the platform is able to provide a more complete vision of a user's total revenue, total cost, net profit, and/or net loss over a given period of time.

Figure 6:
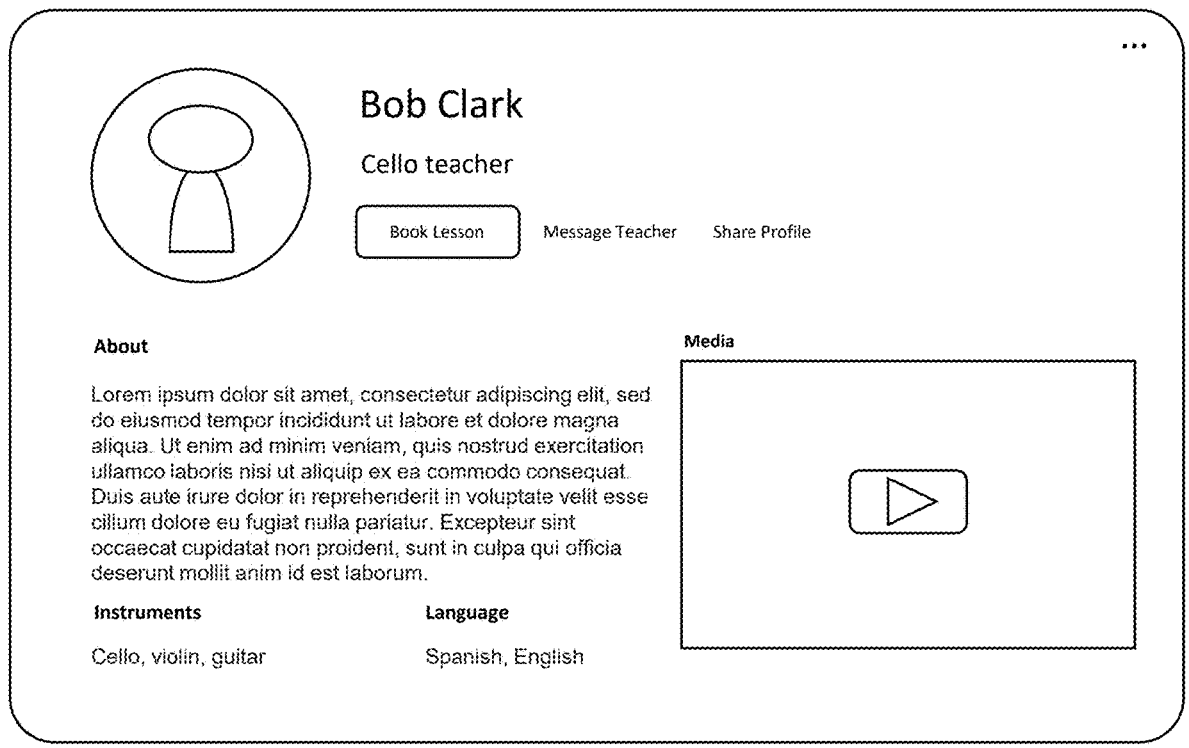
FIG. 6 illustrates a user profile page according to one embodiment of the present invention.

FIG. 6 illustrates a user profile page according to one embodiment of the present invention. In one embodiment, the platform generates a user profile page, visible to other users, providing information about a user such as the user's name, career, personal description, instrument proficiencies, and language proficiencies. In one embodiment, the platform is operable to receive one or more media files (e.g., audio files, video files, images) corresponding to a user profile, one or more of which are displayed on the user profile page. In one embodiment, the platform is operable to receive a command to book a lesson from a user profile from a viewer of the user profile page, and subsequently transmit a lesson booking request message to the user profile. In one embodiment, the platform is operable to automatically generate a link to the user profile page for a viewer of the user profile page.

Figure 7:
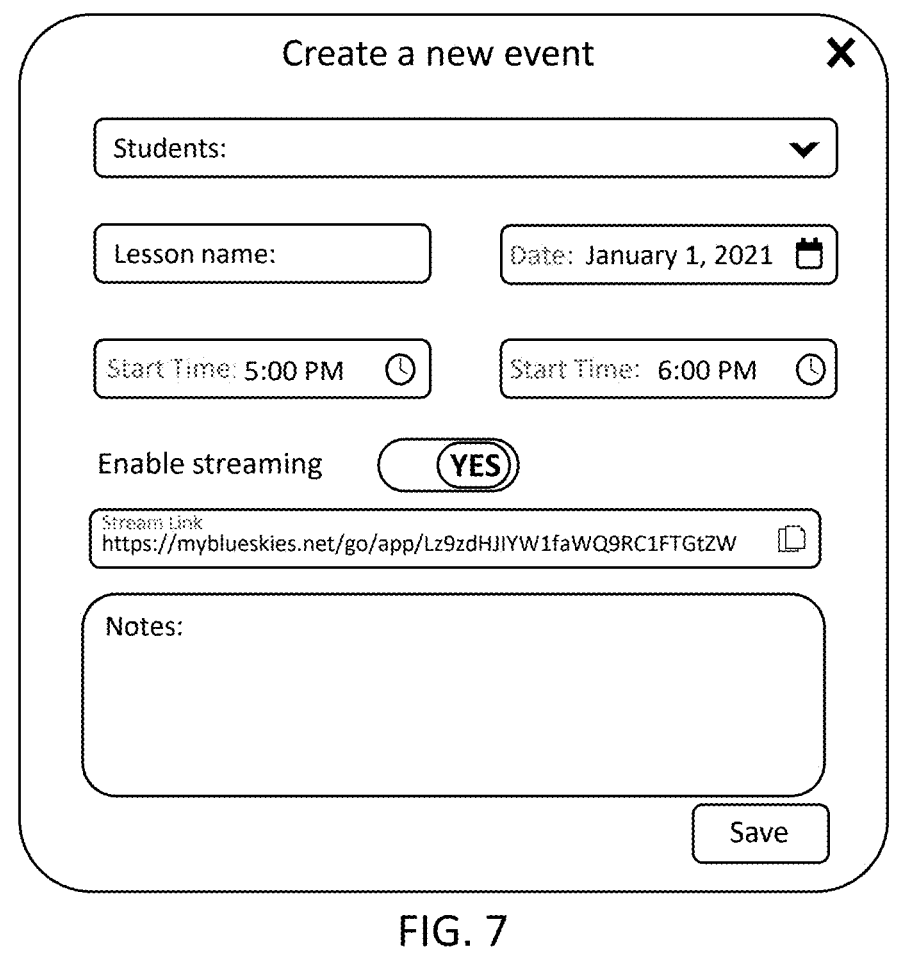

FIG. 7 illustrates an event creation GUI according to one embodiment of the present invention. In one embodiment, the platform is operable to generate an instruction event via user input. Each instruction event includes, but is not limited to, a lesson name, one or more students, a description, a location, one or more subject instruments, one or more skill levels for each selected instrument, one or more designated dates (or recurring day of the week), a start time, an end time, a time zone, a minimum number of participants, a maximum number of participants, a minimum number of video input sources, a price, one or more acceptable payment methods (e.g., direct wire transfer, credit card, debit card, check, etc.), and/or a designated receiving payment account. In one embodiment, the one or more students for the event are selectable via a drop-down menu including a list of managed students for the user profile for the event creator. In one embodiment, the platform is operable to make the instruction event public, meaning the event is visible and joinable to all user profiles on the platform; semi-private, meaning the event is visible to all user profiles, but only joinable by designated user profiles (e.g., friends of the creator); or private, meaning the event is only visible and joinable by designated user profiles, via user input. In one embodiment, the event creation GUI includes an option to enable streaming of the event, allowing third-party viewers to view the event. In one embodiment, when streaming is enabled, the platform automatically generates a streaming link for the event in real-time. In one embodiment, the platform is operable to receive a numerical rating (e.g., a star rating) and/or a textual review for an event from a user device. In one embodiment, the platform only permits ratings and/or reviews to be left for an event if the platform detects that the user profile creating the rating and/or review had previously attended the event. In one embodiment, the platform is operable to generate an average rating for each event.

In one embodiment, the platform automatically sends at least one confirmation message for an event signup to at least one communication means associated with the user profile (e.g., an email address, a phone number, an associated social media account, etc.). The preset interval is operable to include more than one preset interval. Additionally, the preset interval is preferably operable to be selected via preferences in the user profile. In one embodiment, the at least one confirmation message is sent at the time that a user profile signs up for the event. In another embodiment, the at least one confirmation message is sent at a preset interval before the event is due to begin (e.g., 15 minutes before, 3 hours before, 12 hours before, 1 day before, etc.). In yet another embodiment, the platform is operable to receive a selection of a confirmation message timing from the event creator, wherein the confirmation message timing is an interval before the event at which subscribed users are sent the confirmation message. In one embodiment, the confirmation message is a reminder and the platform requires no response from the recipient. In another embodiment, a recipient is automatically unenrolled if no response is received from the recipient within a preset time period (e.g., within one hour, within one day, etc.).

Figure 8:
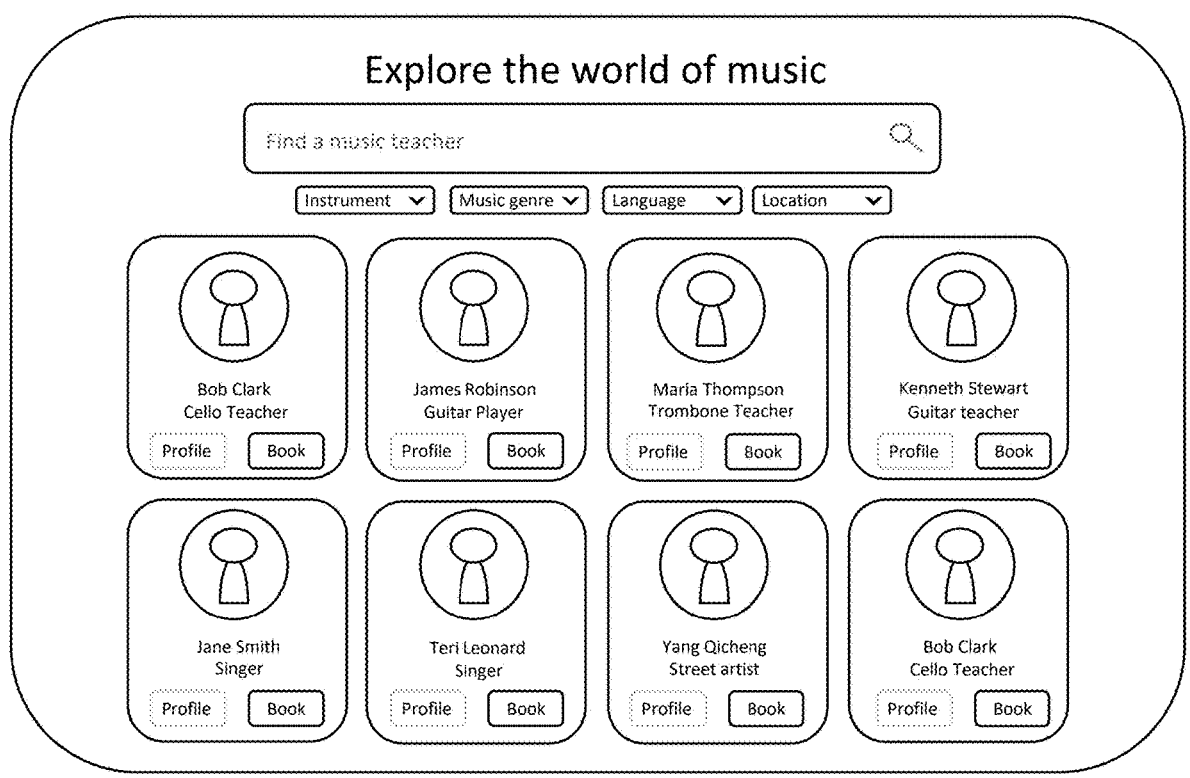
FIG. 8 illustrates a user profile search GUI according to one embodiment of the present invention.

FIG. 8 illustrates a user profile search GUI according to one embodiment of the present invention. In one embodiment, through the search GUI, the platform is operable to generate a list of one or more user profiles meeting or most closely approximating one or more search criteria (e.g., instruments played, musical genres, languages, geographical location, name, etc.). In another embodiment, through the search GUI, the platform is operable to generate a list of one or more events meeting or most closely approximating one or more search criteria. Through the search GUI, users are able to look for events matching their own skill levels for the instruments they are interested in learning. The platform then receives a selection of at least one event that the user profile wishes to join. In one embodiment, the platform is operable to automatically add the event to a calendar associated with the user profile after the event is selected. In one embodiment, if the event conflicts with an existing event on the calendar associated with the user profile, then the platform automatically transmits an alert message to the user profile. In one embodiment, if the selected event has a monetary cost, then the platform is operable to automatically transmit a corresponding quantity of funds from a buyer financial account associated with the buying user profile to a creator financial account associated with the user profile of the event creator. In another embodiment, the platform facilitates the exchange of fiat currency from one or more financial accounts for a corresponding quantity of tokens on the platform. Thereafter, when the platform receives a selection from a user profile to join a paid event, a corresponding number of tokens are deducted from the user account of the buyer and then added to a user account of the event creator. The platform is then able to facilitate the exchange of tokens on the platform for an amount of fiat currency, transferred to a designated financial account associated with the user profile. In one embodiment, the transfer of tokens is recorded on an immutable, distributed ledger (e.g., a blockchain, a directed acyclic graph, etc.).

Figure 9:
FIG. 9 illustrates a student management GUI according to one embodiment of the present invention.

FIG. 9 illustrates a student management GUI according to one embodiment of the present invention. The platform provides a system for instructors to manage their lessons and students. In one embodiment, the platform generates a search user interface, allowing the instructor to search for individuals having user profiles on the platform (e.g., search by name, search by instrument, search by university, etc.). The platform receives a selection to add one or more users to a list of managed students for the instructor. In one embodiment, before the one or more users are added to the list of managed students, the platform receives a confirmation from each of the one or more users. In one embodiment, the platform receives an instruction by an instructor profile to generate a dummy student profile. Dummy student profiles allow an instructor to manage lessons and scheduling even for students without a user profile on the platform. In one embodiment, the platform receives a first name, a last name, an email address, a phone number, one or more instruments, and/or one or more enrolled classes for each dummy student profile. In one embodiment, the platform receives an instruction to generate a classroom. The platform is operable to receive a selection to add at least one user on the list of managed students to at least one classroom. Adding students to classrooms allows an instructor to better organize the list of managed students. In one embodiment, the platform is operable to receive private messages from the instructor and transmit the private messages to users on the list of managed students. In one embodiment, the platform is operable to receive private messages from users on the list of managed students and transmit the private messages to the instructor.

In one embodiment, the platform is operable to create a parent account for one or more associated child accounts. The parent account is operable to limit and/or control features accessible to the one or more associated child accounts. In one embodiment, the parent account receives a copy of all messages sent to the child account.

Figure 10:
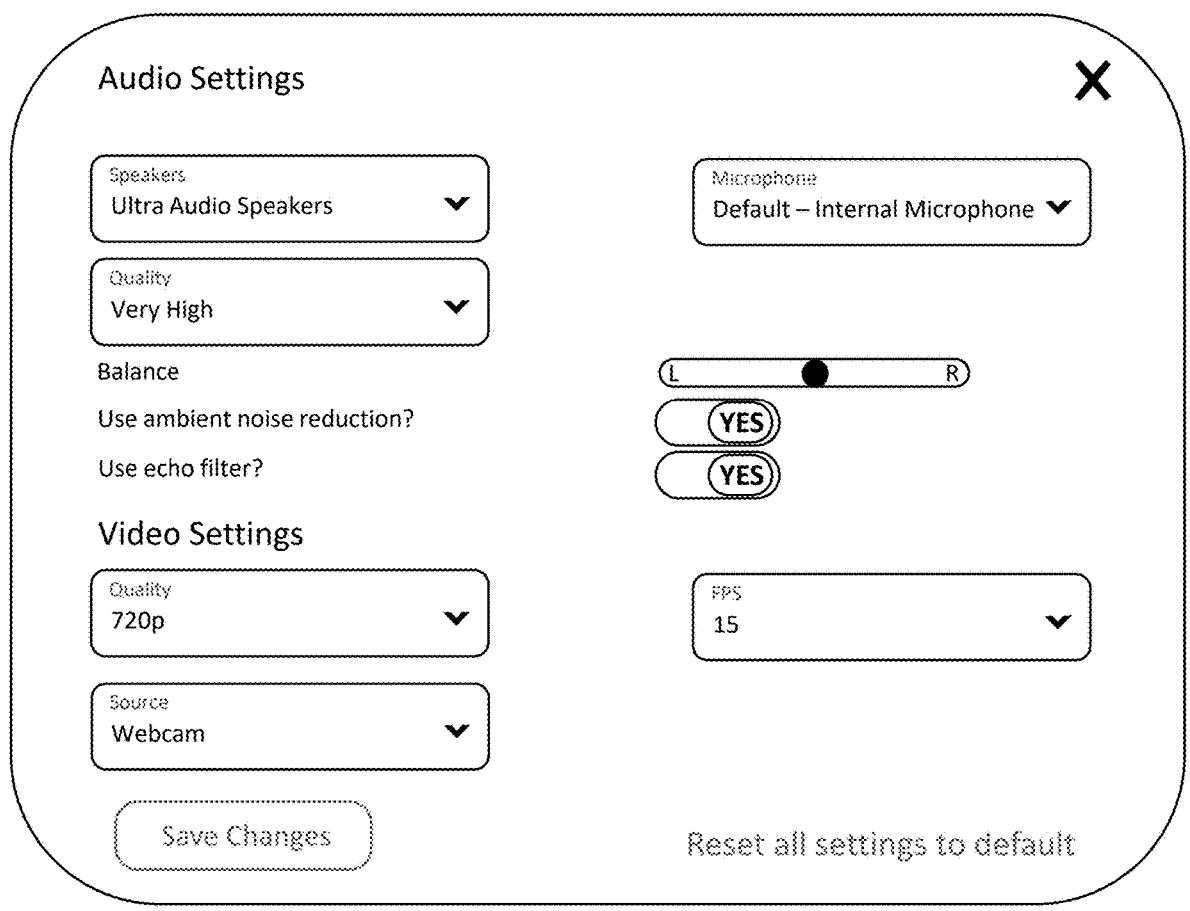
FIG. 10 illustrates an audio and video settings selection GUI according to one embodiment of the present invention.

FIG. 10 illustrates an audio and video settings selection GUI according to one embodiment of the present invention. In one embodiment, the platform is operable to receive a selection of an audio input source (e.g., a microphone). The platform is operable to transmit audiovisual data with very low latency. The platform is operable to automatically detect audio input sources connected to the user device and generates a drop-down GUI list of all connected audio input sources. In one embodiment, the platform is operable to transmit and/or receive a preferred audio quality (e.g., very low, low, medium, high, very high) for a user profile and/or an event. The selected audio quality determines the bit rate of the audio received by a user device used by the user profile during meetings and/or other live events. By allowing the user to select an audio quality and select the audio quality independent of the video quality, the platform allows users to optimize audio quality, even where video quality is reduced to save bandwidth. In one embodiment, the platform is operable to receive a selection of mono or stereo sound. When connection speed for a user on the platform drops, the platform automatically prioritizes audio stream data, rather than video stream data. Therefore, audio on the platform remains at a more consistent quality than audio on other existing platforms. In one embodiment, when a web meeting begins, the platform automatically detects a location of each participant in the web meeting and selects a server in the same region as each of the participants and/or a server in a region occupied by the majority of participants, thereby minimizing latency for the web meeting.

In one embodiment, the platform receives a selection to shift the balance of audio toward the left or the right. Shifting audio balance further allows a user to fine tune audio preferences. Additionally, shifting audio balance allows for more complete sound to be played into a single region, which is useful in situations where a left or right speaker is failing to properly function for a user.

In one embodiment, the platform is operable to receive a selection to activate or deactivate ambient noise reduction. Changing ambient noise reduction is especially important in the music industry. Ambient noise reduction is often used to filter noises including fans, air-conditioning systems, persistent tapping in the background, and/or other persistent noises, allowing speech to be more easily heard and understood during meetings. However, ambient noise reduction often filters out some of the instrumentation in a musical piece, especially if there is a low droning element to the music, or a consistent background beat. Therefore, while a user often prefers to keep ambient noise reduction on during the beginning or end of a lesson when the instructor and students are speaking, it is often desirous to remove ambient noise reduction during portions of a lesson and/or other event during which music is being played. In another embodiment, the platform is operable to receive a selection of a level of ambient noise reduction (e.g., low, medium, or high). In one embodiment, the ambient noise reduction is performed by generating an "anti-noise" acoustic wave, which destructively interferes with the ambient noise, thereby cancelling it out, as described in U.S. Pat. No. 10,425,717, which is incorporated herein by reference in its entirety. In another embodiment, the platform includes a high-pass filter, a low-pass filter, and/or a band-pass filter and automatically filters out a preset range of frequencies in the received audio in order to reduce ambient noise.

In one embodiment, the platform is operable to receive a selection to activate or deactivate an echo filter. One of ordinary skill in the art will understand that the method of echo filtering used by the platform is not intended to be limiting. Examples of echo filtering used in the prior art that are able to be used in the present invention include, but are not limited to, those described in U.S. Pat. Nos. 8,456,508, 8,270,585, and 9,172,817, and U.S. Patent Publication No. 2020/0396329, each of which is incorporated herein by reference in its entirety. Other methods of improving audio that are compatible with the present invention include those methods described in U.S. Patent Pub. No. 2021/0125622, U.S. Pat. Nos. 11,380,345, 11,404,055, and 10,628,165, each of which is incorporated herein by reference in its entirety.

In one embodiment, the platform is operable to automatically generate a visualization of an acoustic wave form corresponding to the audio signals received by the platform. In one embodiment, the platform is operable to receive a selection of a color and/or shape for the acoustic wave form (e.g., a red wave form, a blue wave form, etc.). In one embodiment, the color is operable to be designated by instrument and/or user profile. In one embodiment, the platform is operable to automatically generate a visualization of sound volume (e.g., a digital vu meter). The vu meter is useful in determining whether a microphone is properly functioning and an extent to which an input gain level of a microphone needs to be turned up or down for an optimal experience.

In one embodiment, the system captures and plays portions of the audio waveform of the call having frequencies greater than approximately 12 kHz. This solves a long felt, unmet need for improved audio quality, as it means that the audio waveform heard by participants more closely approximates the original waveform, with frequencies included that are particularly relevant for music. In one embodiment, the system filters out portions of the audio waveform having frequencies greater than approximately 18 kHz.

In one embodiment, the platform receives a selection of a preferred video quality (e.g., 144p, 240p, 360p, 480p, 720p, 1080p, 4K, 8K, etc.). In one embodiment, the platform receives a selection of preferred minimum frames per second (FPS) for a video stream. In one embodiment, the platform receives a selection of a preferred video input source (e.g., a webcam). The platform is operable to automatically detect video input sources connected to the user device and generates a drop-down GUI listing of all connected video input sources. In one embodiment, the platform is operable to receive a plurality of video input sources for a single user profile. By permitting a user to have multiple video input sources, users are able to have cameras simultaneously pointed at, for example, their faces and their instruments. For music lessons, this is useful for both instructors and students, as the students are better able to see what the instructor is doing, while the instructor is better able to discern how well the student is following along with the lesson. For concerts, this allows for a greater number of camera angles to be provided for viewers. In one embodiment, the platform receives a designation of each video input source for a specific purpose (e.g., designate camera 1 for the face, camera 2 for the instrument).

Figure 11:
FIG. 11 illustrates a calendar GUI according to one embodiment of the present invention.

FIG. 11 illustrates a calendar GUI according to one embodiment of the present invention. In one embodiment, the platform includes a built-in calendar, wherein each day on the calendar is click-selectable. When the platform receives a selection of a day, the platform provides a list of all events scheduled for that day. In one embodiment, the platform provides a weekly and/or monthly view, providing a list of all events, including a time, a location, and/or other information, during a selected week or month. In one embodiment, the platform is operable to automatically receive location data from the user device. The platform is operable to automatically update the calendar GUI based on a time zone associated with the received location data.

In one embodiment, the platform is operable to initiate an Application Programming Interface (API) call to one or more third-party music notation programs, including, but not limited to, SIBELIUS, MUSESCORE, GUITAR PRO, FINALE, IMPRO-VISOR, OPENMPT, ANVIL STUDIO, FLAT, or NOTEWORTHY COMPOSER.

Location data is created in the present invention using one or more hardware and/or software components. By way of example and not limitation, location data is created using the Global Positioning System (GPS), low energy BLUETOOTH based systems such as beacons, wireless networks such as WIFI, Radio Frequency (RF) including RF Identification (RFID), Near Field Communication (NFC), magnetic positioning, and/or cellular triangulation. By way of example, location data is determined via an Internet Protocol (IP) address of a device connected to a wireless network. A wireless router is also operable to determine identities of devices connected to the wireless network through the router, and thus is operable to determine the locations of these devices through their presence in the connection range of the wireless router.

Figure 12A:
FIG. 12A illustrates a concert description GUI according to one embodiment of the present invention.
Figure 12B:
FIG. 12B illustrates a concert launch GUI according to one embodiment of the present invention.

FIG. 12A illustrates a concert description GUI according to one embodiment of the present invention. FIG. 12B illustrates a concert launch GUI according to one embodiment of the present invention. In addition to being used for music lessons, the platform provides a high-quality platform for online concert experiences. In one embodiment, the platform automatically generates a countdown timer providing an amount of time remaining until a concert begins, providing a sense of anticipation and excitement leading up to a concert. In one embodiment, the concert description GUI includes a link to donate to an organization and/or an individual associated with the concert. When the concert begins, the concert description GUI converts into a concert launch GUI. The concert launch GUI includes a click-selectable button to enter to watch and/or listen to the concert.

In one embodiment, the platform is operable to receive an input before and/or during a video conference by one or more participants of the video conference to record the video conference. In one embodiment, the platform is operable to generate one or more NFTs of the recording of the video conference. In one embodiment, video is only recorded and/or the NFT is only created if input is received from one or more designated accounts with respect to each video conference, where the designated accounts have permissions to record and/or create NFTs. In one embodiment, the platform is operable to transfer the NFT to a digital wallet associated with one or more user profiles for free or after receipt of payment. In one embodiment, the platform includes an online marketplace GUI for selecting purchase of NFTs corresponding to specific concerts, lessons, and/or other events. The platform is able to automatically receive funds in order of fiat currency and/or one or more different forms of cryptocurrency in exchange for one or more NFTs. In one embodiment, the recordings associated with the NFTs are solely audio recordings. In another embodiment, the recordings associated with the NFTs are audio-video recordings.

In one embodiment, the smart contracts used to generate the NFTs and transfer the NFTs include a designation of at least one artist associated with the NFT (e.g., the artist being recorded, a band being recorded, an orchestra being recorded, etc.). Upon secondary sale of each NFT, at least one digital wallet associated with the at least one artist automatically receives a portion of any cryptocurrency used to purchase the NFT if cryptocurrency is used for the purchase. In one embodiment, at least one financial account associated with the at least one artist automatically receives of portion of any fiat currency used to purchase the NFT if fiat currency is used for the purchase. In this way, the system allows for a built-in royalty program that enables original artists to continue profiting from their performances well into the future.

In one embodiment, the platform includes gamification features to increase engagement and enjoyability. For example, in one embodiment, each user profile is associated with one or more stickers or badges, marking accomplishments on the platform. In one embodiment, stickers or badges are assigned based on a user profile meeting criteria set by the platform itself and are permanently applied to the user profile. Because these types of stickers are defined at the platform-level, they are commonly defined across all accounts and are thus able to be known and recognized by any user on the platform. Examples of criteria for platform-level stickers and/or badges include participating in a minimum number of lessons (e.g., at least 10, at least 50, at least 100, etc.), participating in a minimum number of hours on the platform (e.g., at least 5, at least 20, at least 100, etc.), participating in lessons for a minimum number of distinct instruments (e.g., at least two, at least three, etc.), participating in a first lesson, unique stickers and/or badges for each instrument, and/or other stickers and/or badges. In another embodiment, instructors and/or other users on the platform are able to create stickers and/or badges and define criteria for meeting those badges. This enables instructors to create personalized accomplishments unique tailored to each student. In one embodiment, the personalized stickers and/or badges are automatically assigned to each student based on meeting criteria set by the instructor (e.g., a personalized badge is for participating in 3 lessons with the instructor, and the system automatically gives the badge when three lessons have occurred). In another embodiment, the instructor manually assigns badges and/or stickers to each student profile after criteria are met, allowing stickers and/or badges to be used to mark more subjective accomplishments that the platform does not quantify (e.g., playing a piece in a particular manner). Alternatively, the platform is operable to analyze audio generated by an instrument or vocals in real time or near real time compared to a prerecorded audio file or audio file generated by a computer and reward a musician with a sticker, badge, or tokens based on favorable matching of the real-time or near real-time audio generated by instruments or vocals to the prerecorded audio file or audio file generated by the computer. The prerecorded audio file is operable to be audio recorded by an instructor or audio generated by the instructor during the lesson.

In one embodiment, each user profile is associated with a quantity of tokens. One of ordinary skill in the art will understand that tokens are able to be native cryptocurrency or non-crypto-based points. In one embodiment, tokens are assigned to each profile based on meeting criteria similar to those able to provide stickers and/or badges. In one embodiment, participation in each lesson provides a predetermined number of tokens to each user. In one embodiment, participation in a milestone lesson (e.g., a tenth lesson, a twentieth lesson, etc.) provides a predetermined number of tokens to each user. In one embodiment, tokens are able to be exchanged for rewards on the platform including, but not limited to, extra time on the platform, free lessons, merchandise (e.g., shirts, keychains, cups, etc.), NFTs, and/or other rewards.

Figure 13:
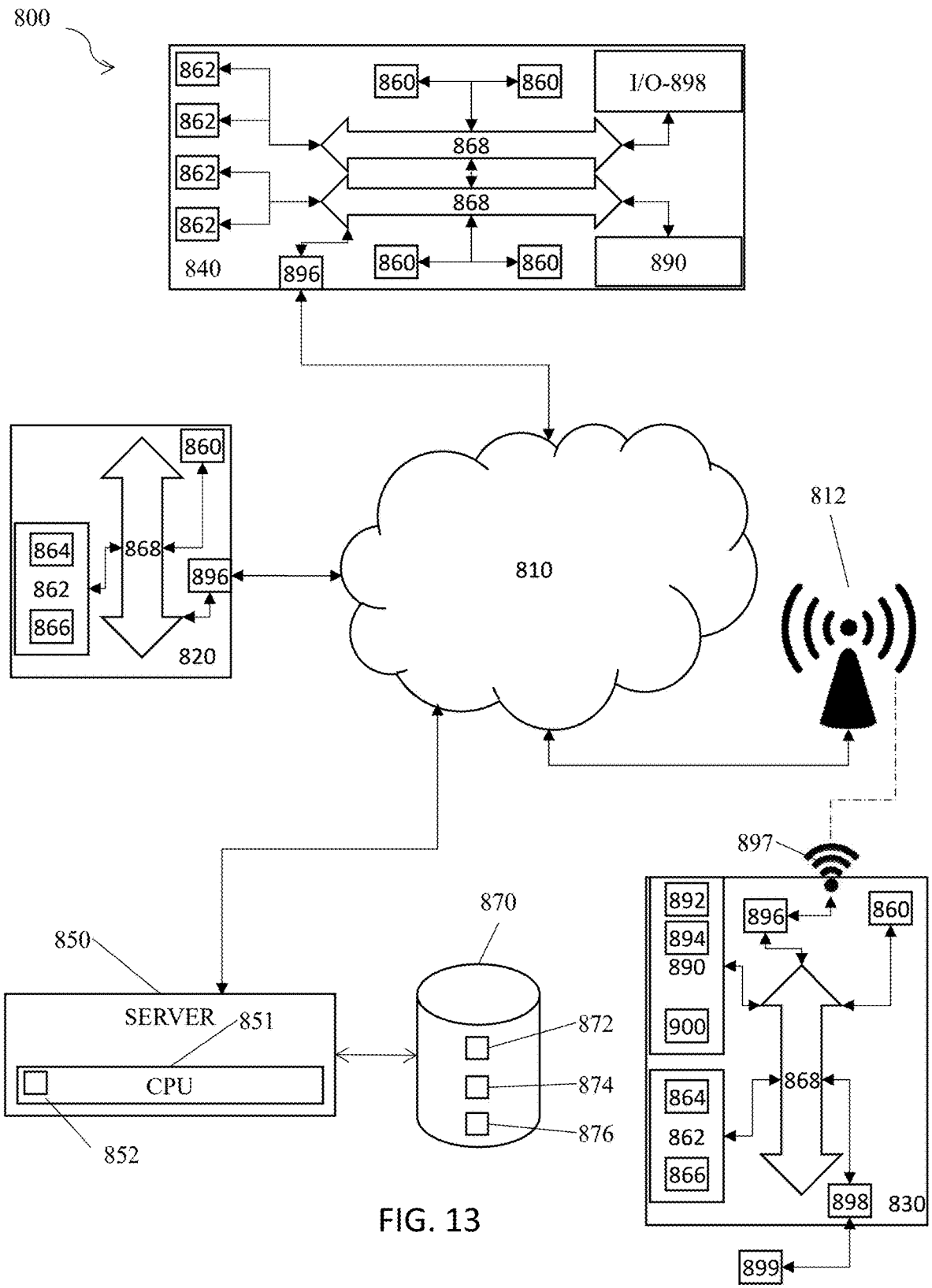
FIG. 13 is a schematic diagram of a system of the present invention.

FIG. 13 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 13, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 13, is operable to include other components that are not explicitly shown in FIG. 13, or is operable to utilize an architecture completely different than that shown in FIG. 13. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

One of ordinary skill in the art will understand that the platform is not intended to be limited to operating on any particular operating system. In one embodiment, the platform is capable on running on any previous, current, or future versions of WINDOWS, MAC OSX, LINUX, ANDROID, IOS, and/or any other operating system.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A system for live audio streaming, comprising:
a server platform, including a processor and a memory, and a database configured for network communication with a plurality of user devices;
wherein the server platform is configured to facilitate audio and/or video calls between two or more of the plurality of user devices;
wherein the server platform receives a recording request to record at least one of the audio and/or video calls, and stores a recording of the at least one of the audio and/or video calls in the database;
wherein the server platform is operable to capture, record, and playback portions of an audio waveform of the audio and/or video calls having frequencies greater than approximately 12 kHz; and
wherein the server platform generates a plurality of user profiles, each user profile including at least one calendar showing past and upcoming events.

2. The system of claim 1, wherein the server platform receives a token creation request to generate at least one non-fungible token (NFT) corresponding to at least one recording, wherein the server platform automatically generates the at least one NFT on a distributed ledger in response to the token creation request, wherein the at least one NFT includes an embedded smart contract, a link to the at least one recording, and a designation of at least one artist financial account; and wherein upon secondary sale of the at least one NFT, the embedded smart contract executes, causing a set percentage of a purchase amount for the at least one NFT to be automatically transferred to the at least one artist financial account.

3. The system of claim 1, wherein the audio and/or video calls include at least one camera aimed at a face of a performer and at least one camera aimed at hands of the performer playing an instrument.

4. The system of claim 1, wherein the server platform filters portions of the audio waveform having frequencies greater than approximately 18 kHz.

5. The system of claim 1, wherein, at a predetermined time interval before each event on the at least one calendar for a user profile, the server platform transmits a notification to at least one user device associated with the user profile.

6. The system of claim 1, wherein the server platform includes a search interface, and wherein the search interface generates a list of relevant instructors based on instrument, type of music, and/or availability of the instructors.

7. The system of claim 1, wherein the plurality of user devices include at least one mobile phone, at least one tablet, and/or at least one computer.

8. A system for generating unique audio-based tokens, comprising:
a server platform, including a processor and a memory, and a database configured for network communication with a plurality of user devices;
wherein the server platform generates a plurality of user profiles;
wherein the server platform receives a request from a first user profile to generate a dummy account, wherein the dummy account corresponds to at least one individual that does not currently have a corresponding user profile and wherein the dummy account is added to a list of contacts for the first user profile;
wherein the server platform receives a request from the first user profile to associate the dummy account with an actual user profile, and wherein the server platform automatically replaces each instance of the dummy account with the actual user profile;
wherein the server platform stores one or more audio and/or video recordings in the database;
wherein the server platform receives a token creation request to generate at least one non-fungible token (NFT) corresponding to at least one recording;
wherein the server platform automatically generates the at least one NFT on a distributed ledger in response to the token creation request, wherein the at least one NFT includes an embedded smart contract, a link to the at least one recording, and a designation of at least one artist financial account; and
wherein upon secondary sale of the at least one NFT, the embedded smart contract executes, causing a set percentage of a purchase amount for the at least one NFT to be automatically transferred to the at least one artist financial account.

9. The system of claim 8, wherein the at least one artist financial account includes at least one cryptocurrency wallet.

10. The system of claim 8, wherein the audio and/or video recordings calls include at least one camera aimed at a face of a performer and at least one camera aimed at hands of the performer playing an instrument.

11. The system of claim 8, wherein the server platform includes an NFT marketplace, and wherein the server platform is operable to receive requests to purchase one or more NFTs on the NFT marketplace.

12. The system of claim 8, wherein the server platform includes a search interface, and wherein the search interface generates a list of relevant instructors based on instrument, type of music, and/or availability of the instructors.

13. The system of claim 8, wherein the plurality of user devices include at least one mobile phone, at least one tablet, and/or at least one computer.

14. The system of claim 8, wherein each user profile includes at least one calendar showing past and upcoming events.

15. The system of claim 14, wherein, at a predetermined time interval before each event on the at least one calendar for a user profile, the server platform transmits a notification to at least one user device associated with the user profile.

16. A method for live audio streaming, comprising:
providing a server platform, including a processor and a memory, and a database configured for network communication with a plurality of user devices;
the server platform is configured facilitating audio and/or video calls between two or more of the plurality of user devices;
the server platform receiving a recording request to record at least one of the audio and/or video calls, and storing a recording of the at least one of the audio and/or video calls in the database;
the server platform receiving a token creation request to generate at least one non-fungible token (NFT) corresponding to the recording;
the server platform automatically generating the at least one NFT on a distributed ledger in response to the token creation request, wherein the at least one NFT includes an embedded smart contract, a link to the recording, and a designation of at least one artist financial account; and
upon secondary sale of the at least one NFT, the embedded smart contract executing, causing a set percentage of a purchase amount for the at least one NFT to be automatically transferred to the at least one artist financial account.

17. The method of claim 16, further comprising the at least one artist financial account including at least one cryptocurrency wallet.

18. The method of claim 16, further comprising the audio and/or video calls including at least one camera aimed at a face of a performer and at least one camera aimed at hands of the performer playing an instrument.

19. The method of claim 16, further comprising the server platform including an NFT marketplace, and the server platform receiving requests to purchase one or more NFTs on the NFT marketplace.

\* \* \* \* \*